(12) United States Patent
Luszcz et al.

(10) Patent No.: US 10,259,575 B2
(45) Date of Patent: Apr. 16, 2019

(54) FEED-FORWARD COMPENSATION FOR GYROSCOPIC LOADS IN A COAXIAL ROTOR

(71) Applicant: Sikorsky Aircraft Corporation, Stratford, CT (US)

(72) Inventors: Matthew T. Luszcz, Hamden, CT (US); Matthew A. White, Milford, CT (US); Kenneth S. Wittmer, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 31 days.

(21) Appl. No.: 15/513,726

(22) PCT Filed: Sep. 21, 2015

(86) PCT No.: PCT/US2015/051204
§ 371 (c)(1),
(2) Date: Mar. 23, 2017

(87) PCT Pub. No.: WO2016/060788
PCT Pub. Date: Apr. 21, 2016

(65) Prior Publication Data
US 2017/0297693 A1    Oct. 19, 2017

Related U.S. Application Data

(60) Provisional application No. 62/055,162, filed on Sep. 25, 2014.

(51) Int. Cl.
*B64C 27/57* (2006.01)
*B64C 27/10* (2006.01)
(Continued)

(52) U.S. Cl.
CPC .............. *B64C 27/57* (2013.01); *B64C 27/10* (2013.01); *B64C 27/605* (2013.01); *B64C 27/22* (2013.01)

(58) Field of Classification Search
CPC ....................................................... B64C 27/57
See application file for complete search history.

(56) References Cited

U.S. PATENT DOCUMENTS

| 3,521,971 A | 7/1970 | Cheney, Jr. |
| 4,025,230 A | 5/1977 | Kastan |
| (Continued) | | |

FOREIGN PATENT DOCUMENTS

| EP | 2476614 A2 | 7/2012 |
| JP | 2002211495 A | 7/2002 |
| (Continued) | | |

OTHER PUBLICATIONS

Notification Concerning Transmittal of International Preliminary Report on Patentability; International Application No. PCT/US2015/051204; International Filing Date; Sep. 21, 2015; dated Apr. 6, 2017; pp. 1-7.

(Continued)

*Primary Examiner* — Hussein Elchanti
*Assistant Examiner* — Michael A Berns
(74) *Attorney, Agent, or Firm* — Cantor Colburn LLP

(57) ABSTRACT

A system and method for counteracting a rotor moment of one or more rotors of a coaxial rotor helicopter includes receiving signals with a processor indicative of a displacement command from a controller during a flight maneuver; receiving one or more signals with the processor from a sensor indicative of an airspeed and air density for the helicopter; determining a commanded rate of acceleration for the helicopter during the flight maneuver; and adjusting with one or more control servos a cyclic pitch for the one or (Continued)

more rotors to counteract the rotor moment during the flight maneuver.

12 Claims, 4 Drawing Sheets

(51) Int. Cl.
   *B64C 27/605* (2006.01)
   *B64C 27/22* (2006.01)

(56) References Cited

U.S. PATENT DOCUMENTS

| | | | |
|---|---|---|---|
| 4,027,999 A | 6/1977 | Durno | |
| 5,188,511 A * | 2/1993 | Ebert | B64C 27/82 244/17.19 |
| 5,850,615 A | 12/1998 | Osder | |
| 6,053,452 A | 4/2000 | Yamakawa et al. | |
| 6,189,836 B1 | 2/2001 | Gold et al. | |
| 6,885,917 B2 | 4/2005 | Osder et al. | |
| 9,085,352 B2 * | 7/2015 | Eglin | B64C 13/16 |
| 2012/0056031 A1 | 3/2012 | Lading et al. | |
| 2012/0181379 A1 * | 7/2012 | Eller | B64C 27/04 244/17.13 |
| 2017/0233067 A1 * | 8/2017 | Eller | B64C 27/57 701/3 |
| 2017/0315563 A1 * | 11/2017 | Wulff | G05D 1/0858 |
| 2017/0334556 A1 * | 11/2017 | Fegely | B64C 27/80 |
| 2018/0065738 A1 * | 3/2018 | Lappos | B64C 27/57 |

FOREIGN PATENT DOCUMENTS

| | | |
|---|---|---|
| WO | 9305462 | 3/1993 |
| WO | 199720736 A1 | 6/1997 |
| WO | 2002064426 A1 | 8/2002 |
| WO | 2011146349 A2 | 11/2011 |

OTHER PUBLICATIONS

The extended European search report; Application No. 15851070.1; EP Filing Date: Mar. 20, 2017; dated Jan. 24, 2018; pp. 1-9.
PCT International Search Report and Written Opinion; International Application No. PCT/US15/51204; International Filing Date: Sep. 21, 2015; dated Mar. 11, 2016; pp. 1-14.

* cited by examiner

FEED-FORWARD COMPENSATION FOR GYROSCOPIC LOADS IN A COAXIAL ROTOR

CROSS REFERENCE TO RELATED APPLICATIONS

The present application is a National Stage Application claiming priority to Patent Application PCT/US2015/051204 filed on Sep. 21, 2015, which claims priority to U.S. Provisional Application Ser. No. 62/055,162, filed on Sep. 25, 2014, the contents of which are incorporated herein by reference in their entirety.

BACKGROUND

The subject matter disclosed herein relates generally to the field of helicopters, and to control and reduction of gyroscopic rotor moments in rigid, coaxial-rotor helicopters.

DESCRIPTION OF RELATED ART

One class of dual rotor helicopters is comprised of those with two coaxial, counter-rotating rotors, a sub-class of which includes rotors whose flapping stiffness is high enough to be considered rigid. During helicopter maneuvers, gyroscopic moments acting on each rotor are produced which are equal to the rotor mass moment of inertia, times the vector cross-product of the rotor angular velocity and the helicopter angular velocity. These rotor moments are therefore produced at a right angle to the plane formed by the aircraft angular velocity and the direction of rotor rotation. Since the rotors are counter-rotating, the rotor gyroscopic moments acting on each rotor are substantially opposing. For example, a helicopter roll rate produces opposing rotor pitch moments in the rotors; and a helicopter pitch rate produces opposing rotor roll moments in the rotor. These rotor moments lead to large bending loads along the blade that drive the blade tips together. The large bending loads fatigue the shafts that carry the loads and compromise clearance between the dual rotors. A method to compensate for these gyroscopic loads would be well received in the art.

BRIEF SUMMARY

According to one aspect of the invention, a method for counteracting a rotor moment of one or more rotors of a coaxial rotor helicopter, includes receiving signals with a processor indicative of a displacement command from a controller during a flight maneuver; receiving one or more signals with the processor from a sensor indicative of an airspeed and air density for the helicopter; determining commanded rate for the helicopter during the flight maneuver; and adjusting with one or more control servos a cyclic pitch for the one or more rotors to counteract the rotor moment during the flight maneuver.

According to another aspect of the invention, a control system for counteracting a rotor moment of one or more rotors of a coaxial rotor helicopter with one or more sensors configured to determine an airspeed and air density for the helicopter; a processor; and memory having instructions stored thereon that, when executed by the processor, cause the system to: receive signals indicative of a displacement command from a controller during a flight maneuver; receive signals indicative of the airspeed and the air density for the helicopter; determine a commanded rate for the helicopter during the flight maneuver; and adjust with one or more control servos a cyclic pitch for the one or more rotors to counteract the rotor moment during the flight maneuver.

In another aspect of the invention, a helicopter having an airframe, coaxial rotors disposed concentrically at the airframe, each rotor including a plurality of rotor blades, and a control system for counteracting a rotor moment of one or more rotors of the two rotors with one or more sensors configured to determine an airspeed and air density for the helicopter; a processor; and memory having instructions stored thereon that, when executed by the processor, cause the system to: receive signals indicative of a displacement command from a controller during a flight maneuver; receive signals indicative of the airspeed and the air density for the helicopter; determine a commanded rate for the helicopter during the flight maneuver; and adjust with one or more control servos a cyclic pitch for the one or more rotors to counteract the rotor moment during the flight maneuver.

In addition to one or more of the features described above, or as an alternative, further embodiments could include a commanded body roll rate.

In addition to one or more of the features described above, or as an alternative, further embodiments could include a commanded body pitch rate.

In addition to one or more of the features described above, or as an alternative, further embodiments could include adjusting at least one of a longitudinal cyclic pitch and a lateral cyclic pitch.

In addition to one or more of the features described above, or as an alternative, further embodiments could include adjusting the longitudinal cyclic pitch as a function of a commanded body roll rate, a defined air speed, and an air density ratio.

In addition to one or more of the features described above, or as an alternative, further embodiments could include adjusting the lateral cyclic pitch as a function of a commanded body pitch rate and a defined air speed and an air density ratio.

In addition to one or more of the features described above, or as an alternative, further embodiments could include determining a feed-forward compensator gain as a function of the airspeed, the commanded body rates and an air density ratio.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
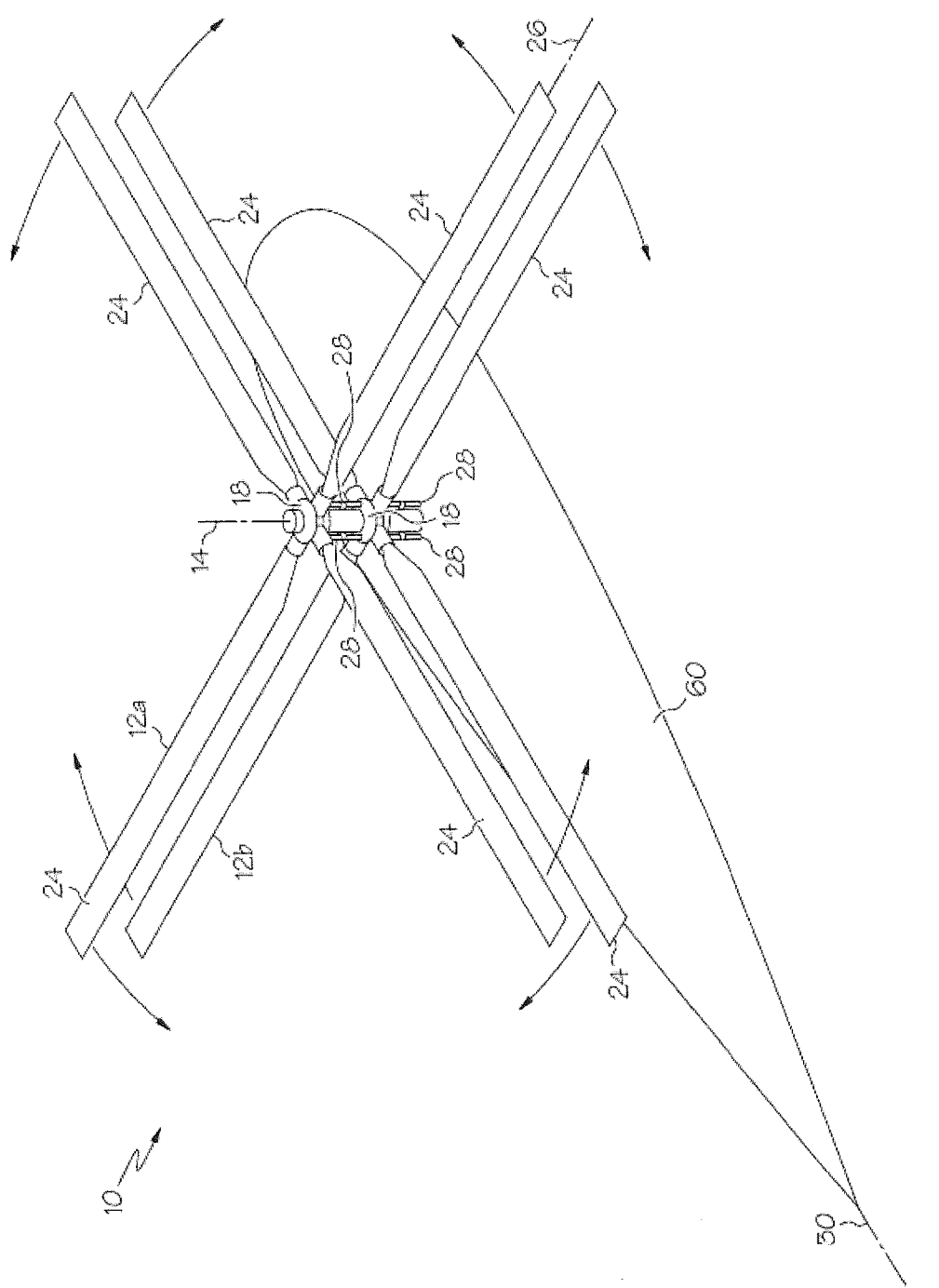
FIG. 1 is a schematic view of an exemplary helicopter according to an embodiment of the invention.

Shown in FIG. 1 is a schematic of an embodiment of rotary-wing aircraft such as, for example, a coaxial rotor helicopter 10. The helicopter 10 includes an airframe 60 and two rotors 12a and 12b arranged concentrically at the airframe 60 at a rotor axis 14. The rotors 12a and 12b are counter-rotating such that, for example, when viewed from above, rotor 12a rotates in a counterclockwise direction and rotor 12b rotates in a clockwise direction. It is to be appreciated that, in other embodiments, the directions of rotation of the rotors 12a and 12b may be reversed. Each of the rotors 12a and 12b is connected to a conventional swashplate 18 so that motion of the swashplate 18 along the rotor axis 14 will cause the blades 24 to vary pitch collectively relative to a blade axis 26 and tilting of the swashplate 18 relative to the axis 14 will cause the blades 24 to pitch cyclically relative to the blade axis 26. The swashplate 18 is driven by one or more control servos 28 to move and/or tilt the swashplate 18 with respect to the rotor axis 14.

Figure 2:
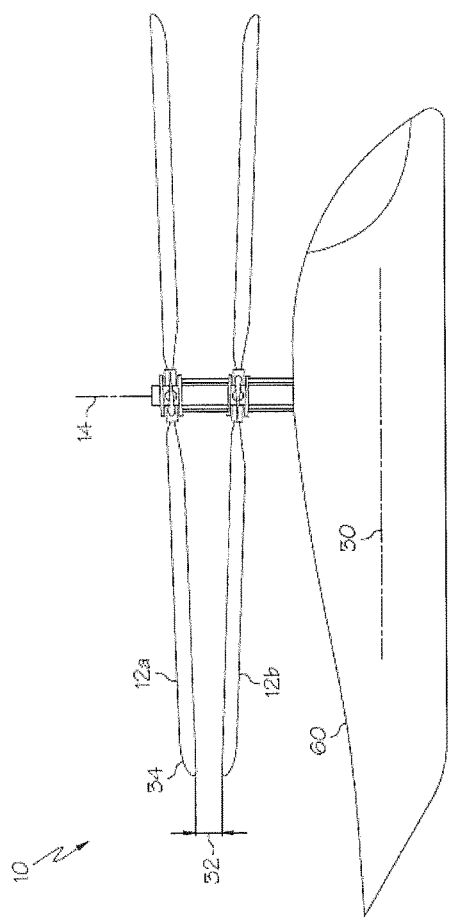
FIG. 2 is a schematic of an embodiment of a helicopter during a roll left maneuver.
Figure 3:
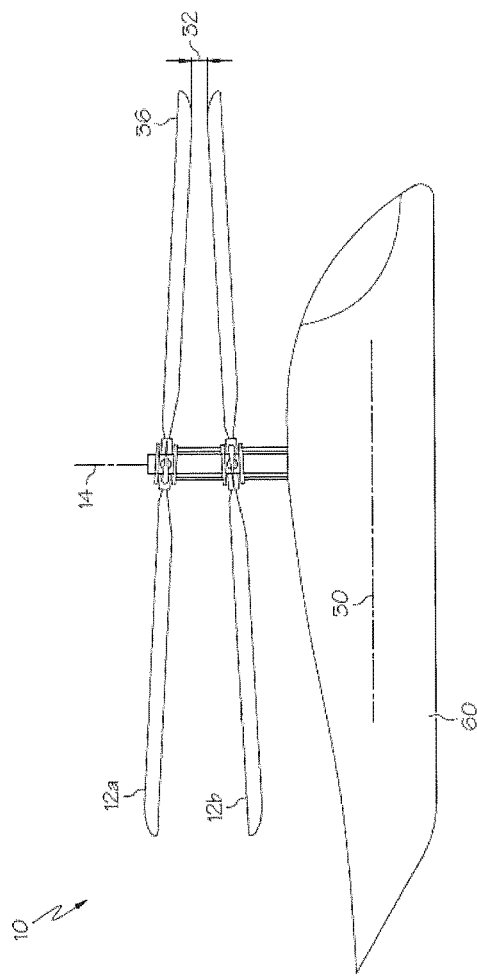
FIG. 3 is a schematic of an embodiment of a helicopter during a roll right maneuver.

Referring now to FIG. 2, when the helicopter 10 performs a maneuver in rolling to the left about a helicopter axis 30, rotor pitch moments are induced in the rotors 12a and 12b at a right angle to the helicopter angular velocity such that rotor 12a tends to be pitched upwardly and the rotor 12b tends to be pitched downwardly. This can create a close clearance 32 at a rear portion 34 of the rotors 12a and 12b. Similarly, as shown in FIG. 3, when the helicopter 10 rolls to the right, rotor 12a tends to be pitched upwardly and rotor 12b tends to be pitched downwardly. This results in a close clearance 32 at a forward portion 36 of the rotors 12a and 12b. One of ordinary skill in the art will readily understand that other maneuvers, such as pitch maneuvers of the helicopter 10, will result in substantially equal and opposite rotor moments in the rotors 12a and 12b. Such rotor moments induce stresses in the rotors 12a and 12b due to the large gyroscopic bending loads and it is desired to minimize the bending loads and provide sufficient clearance between rotors 12a and 12b.

Figure 4:
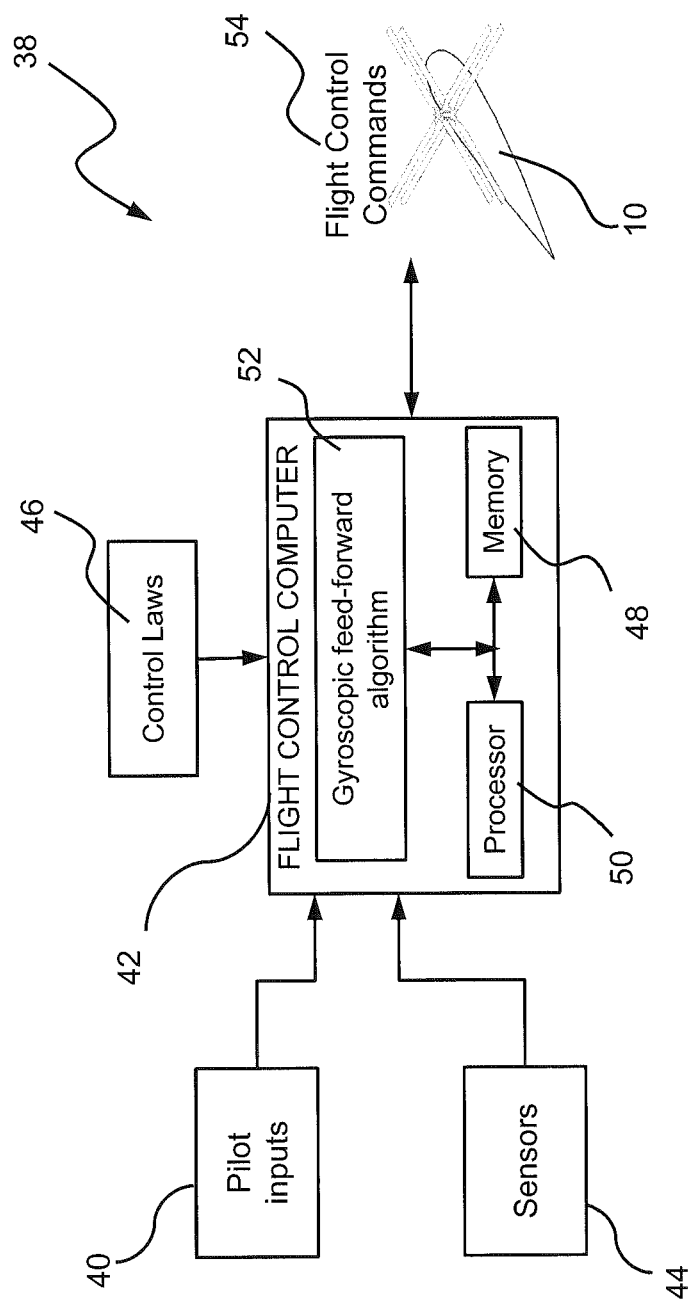
FIG. 4 is a schematic diagram of an embodiment of a control system for a helicopter.

Referring to FIG. 4, in order to compensate/reduce the rotor moments induced by such maneuvers, a model following control system 38 implements a gyroscopic feed forward compensation algorithm 52 (hereinafter "feed forward algorithm 52") in order to improve stability and robustness of the control system 38. The feed-forward algorithm 52 uses, in an embodiment, body pitch or body roll commanded rates and a schedule of corrective cyclic inputs for these commanded body-pitch or roll rates in order to drive cyclic pitch changes in the rotors 12a and 12b. These cyclic pitch changes counteract the gyroscopic rotor moments with aerodynamic forces on the blades. The feed forward algorithm 52 utilizes a feed-forward commanded body pitch or body roll rate as the actual pitch or roll rate. A schematic of a control system 38 to accomplish this is illustrated in FIG. 4.

Pilot inputs 40 from, for example, a cyclic controller such as a pilot cyclic stick, and/or foot pedals are received by a computer 42 as commanded body pitch or roll rates. The pilot inputs 40 indicate direction of flight, for example, roll, pitch, or the like. A number of sensors 44 are located at the helicopter 10 to sense parameters of helicopter 10 flight such as pitch and/or roll angular velocities, pitch and/or roll angular accelerations, vertical acceleration, airspeed, air density, or the like. Data from the sensors 44 is provided to the computer 42 operably connected to the sensors 44. Computer 42 compares the sensor data to control laws 46, which define flight control commands 54 for the helicopter 10 based on a schedule of corrective lateral and longitudinal cyclic inputs as a function of airspeed and density ratio and the commanded roll and pitch rates from pilot inputs 40.

The control system 38 includes a computer 42 that determines estimated differential longitudinal and lateral cyclic pitch inputs as a function of the commanded body pitch and roll rates. The estimated inputs produce a desired aerodynamic response for the gyroscopic moments induced on the rotors 12a-12b (FIG. 1). In an embodiment, computer 42 includes a memory 48. The memory 48 stores feed forward algorithm 52 as executable instructions that is executed by a processor 50. The instructions may be stored or organized in any manner and at any level of abstraction, such as in connection with the execution of the compensation algorithm. The processor 50 may be any type of processor (CPU), including a general purpose processor, a digital signal processor, a microcontroller, an application specific integrated circuit, a field programmable gate array, or the like. Also, in embodiments, memory 48 may include random access memory (RAM), read only memory (ROM), or other electronic, optical, magnetic, or any other computer readable medium onto which is stored the mixing algorithm described below.

Figure 5:
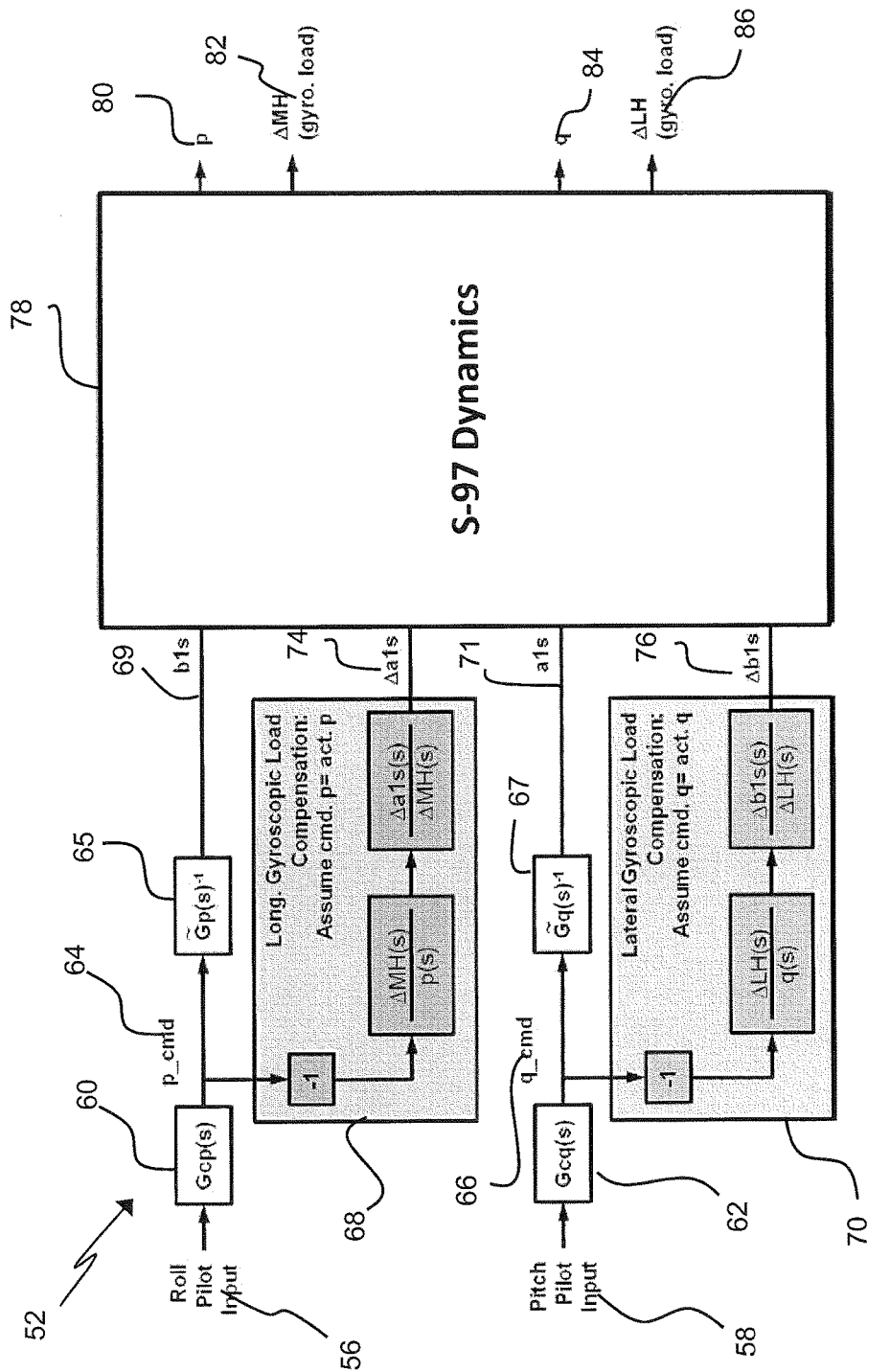
FIG. 5 is a schematic block diagram for implementing a feed-forward compensation algorithm according to an embodiment of the invention.

FIG. 5 illustrates a schematic block diagram of circuitry for implementing the feed forward algorithm 52 by computer 42 (FIG. 4) according to an embodiment of the invention. The feed forward algorithm 52 includes pilot cyclic roll stick input signal 56 and cyclic pitch stick input signal 58. The signals 56, 58 are applied to each of a roll dynamic shaping block 60 and a pitch dynamic shaping block 62. The dynamic shaping blocks 60, 62 include gain constants which are maintained in one or more lookup tables in memory 48 (FIG. 4) for the respective stick input signals 56, 58.

The dynamic shaping blocks 60, 62 output a respective commanded roll rate 64 and a commanded pitch rate 66 of the model-following control system 38. These commanded roll and pitch rates 64 and 66 are applied to respective longitudinal and lateral load compensator blocks 68, 70 and blocks 65, 67. The load compensator blocks 68, 70 are gyroscopic compensator blocks that include a schedule of corrective cyclic inputs as a function of, in embodiments, airspeed and air density for the commanded roll and pitch rates 64, 66 which are stored in one or more lookup tables in memory 48 (FIG. 4). Also, load compensator blocks 68, 70 utilize the commanded roll and pitch rates 64, 66 as the actual pitch or roll rates during a determination of the corrective cyclic input.

Longitudinal gyroscopic load compensator block 68 determines a signal for a longitudinal compensator gain 74 from a schedule of corrective longitudinal cyclic inputs. A corrective longitudinal cyclic input provides corrective signals as a function of air speed, air density ratio, and commanded roll rate 64. The air density ratio is the relative density of air in flight over the density of air at sea level. Thus, the compensator gain 74 is a function of true airspeed of the helicopter 10, scheduled gain, and air density ratio. The compensator gain 74 represents an amount of differential longitudinal cyclic pitch per degree per second of commanded roll rate that is to be applied to the off-axis in order to counteract the rotor moments with aerodynamic loads via rotor longitudinal cyclic pitch changes. Similarly, lateral gyroscopic load compensator block 70 determines a compensator gain signal 76 for a lateral compensator gain from a schedule of corrective lateral cyclic inputs. A corrective lateral cyclic input provides corrective signals as a function of air speed, air density ratio, and commanded pitch rate 66. Air density ratio is the relative density of air in flight over the density of air at sea level. Thus, the compensator gain signal 76 is a function of the airspeed of the helicopter 10, scheduled gain, and air density ratio. The compensator gain 76 signal represents an amount of differential lateral cyclic pitch per degree per second of commanded pitch rate that is to be applied to the off-axis in order to counteract the off-axis rotor moments with aerodynamic loads via rotor lateral cyclic pitch changes.

Compensator gain signals 74, 76 from respective longitudinal and lateral load compensators 68, 70 are inputted into mixing block 78. Additionally, output signals 69, 71 from respective blocks 65, 67 are inputted into mixing block. Signal 69 represents lateral cyclic pitch commands while signal 71 represents longitudinal cyclic pitch commands. Block 78 represents a mathematical representation of aircraft that receives the signals 69, 71, 74, and 76 by flight control computer 42 (FIG. 4) and determines displacement commands 80, 82, 84, and 86 for displacement of servos and actuators of rotors 12*a*-12*b* (FIG. 1) in order to produce desired aerodynamic response for the gyroscopic moments induced on the rotors 12*a*-12*b* (FIG. 1) Mixing block 78 multiplies respective commanded rates with compensator gain to determine an actual roll rate 80, actual pitch rate 84, a differential longitudinal cyclic pitch command 82, and a differential lateral cyclic pitch command 86 in order to counteract the off-axis coupling moments in the helicopter 10.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for counteracting a rotor moment of one or more rotors of a coaxial rotor helicopter, comprising:
   receiving signals with a processor indicative of a displacement command from a controller during a flight maneuver;
   receiving one or more signals with the processor from a sensor indicative of an airspeed and air density for the helicopter;
   determining a commanded rate for the helicopter during the flight maneuver from the signals from the controller;
   determining a feed-forward compensator gain as a function of the airspeed, the commanded rate, and an air density ratio;
   multiplying the commanded rate by the feed-forward compensator gain to determine a differential cyclic pitch command; and
   adjusting with one or more control servos a cyclic pitch for the one or more rotors using the different cyclic pitch command to counteract the rotor moment during the flight maneuver.

2. The method of claim 1, wherein the determining of the commanded rate further comprises determining a commanded body roll rate.

3. The method of claim 1, wherein the determining of the commanded rate further comprises determining a commanded body pitch rate.

4. The method of claim 1, wherein the adjusting the cyclic pitch further comprises adjusting at least one of a longitudinal cyclic pitch and a lateral cyclic pitch.

5. The method of claim 4, further comprising adjusting the longitudinal cyclic pitch as a function of a commanded roll rate, a defined air speed, and an air density ratio.

6. The method of claim 4, further comprising adjusting the lateral cyclic pitch as a function of a commanded pitch rate and a defined air speed and an air density ratio.

7. A control system for counteracting a rotor moment of one or more rotors of a coaxial rotor helicopter, comprising:
   one or more sensors configured to determine an airspeed and air density for the helicopter;
   a processor; and
   memory having instructions stored thereon that, when executed by the processor, cause the system to:
   receive signals indicative of a displacement command from a controller during a flight maneuver;
   receive signals indicative of the airspeed and the air density for the helicopter;
   determine a commanded rate for the helicopter during the flight maneuver from the signals from the controller;
   determine a feed-forward compensator gain as a function of the airspeed, the commanded rate, and an air density ratio;
   multiplying the commanded rate by the feed-forward compensator gain to determine a differential cyclic pitch command; and
   adjust with one or more control servos a cyclic pitch for the one or more rotors using the differential cyclic pitch command to counteract the rotor moment during the flight maneuver.

8. The control system of claim 7, wherein the processor is configured to determine a commanded body roll rate.

9. The control system of claim 7, wherein the processor is configured to determine a commanded body pitch rate.

10. The control system of claim 7, wherein the processor is configured to adjust at least one of a longitudinal cyclic pitch and a lateral cyclic pitch.

11. The control system of claim 10, wherein the processor is configured to adjust the longitudinal cyclic pitch as a function of a commanded roll rate, a defined air speed, and an air density ratio.

12. The control system of claim 10, wherein the processor is configured to adjust the lateral cyclic pitch as a function of a commanded pitch rate and a defined air speed and an air density ratio.

* * * * *